(12) United States Patent
Thiriet et al.

(10) Patent No.: US 11,198,505 B2
(45) Date of Patent: Dec. 14, 2021

(54) METHOD AND SYSTEM FOR CONTROLLING AN EMERGENCY DEVICE

(71) Applicant: SAFRAN HELICOPTER ENGINES, Bordes (FR)

(72) Inventors: Romain Thiriet, Moissy-Cramayel (FR); Jean Michel Bazet, Moissy-Cramayel (FR); Jean-Luc Charles Gilbert Frealle, Moissy-Cramayel (FR); Pierre Darfeuil, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 149 days.

(21) Appl. No.: 16/480,260

(22) PCT Filed: Feb. 14, 2018

(86) PCT No.: PCT/FR2018/050358
§ 371 (c)(1),
(2) Date: Jul. 23, 2019

(87) PCT Pub. No.: WO2018/150138
PCT Pub. Date: Aug. 23, 2018

(65) Prior Publication Data
US 2019/0337611 A1   Nov. 7, 2019

(30) Foreign Application Priority Data
Feb. 15, 2017   (FR) .......................... 1751219

(51) Int. Cl.
*B64C 27/00* (2006.01)
*B64C 13/24* (2006.01)
(Continued)

(52) U.S. Cl.
CPC .......... *B64C 27/006* (2013.01); *B64C 13/24* (2013.01); *B64C 27/008* (2013.01); *B64C 27/06* (2013.01); *B64C 27/57* (2013.01); *B64D 31/06* (2013.01)

(58) Field of Classification Search
CPC ..... B64C 27/006; B64C 27/008; B64C 27/06; B64C 27/57; B64C 13/24; B64D 31/06
See application file for complete search history.

(56) References Cited

U.S. PATENT DOCUMENTS

| | | | |
|---|---|---|---|
| 5,145,324 A * | 9/1992 | Dickes | F04B 49/10 417/222.1 |
| 2012/0133150 A1* | 5/2012 | Dooley | B64D 41/00 290/1 A |

(Continued)

FOREIGN PATENT DOCUMENTS

| | | |
|---|---|---|
| EP | 2404775 A2 | 1/2012 |
| EP | 2703292 A2 | 3/2014 |

(Continued)

OTHER PUBLICATIONS

International Search Report received for PCT Patent Application No. PCT/FR2018/050358, dated Apr. 3, 2018, 5 pages (2 pages of English Translation and 3 pages of Original Document).

*Primary Examiner* — Rodney A Bonnette
(74) *Attorney, Agent, or Firm* — Womble Bond Dickinson (US) LLP

(57) ABSTRACT

The invention relates to a method for controlling an emergency device of a helicopter, said helicopter comprising a rotor suitable for being rotated, said emergency device being suitable for supplying additional emergency propulsion power to the helicopter, in said method comprising a step (10) of measuring the rotation speed of the helicopter rotor, a step (12) of calculating the drift of the measured rotation speed, a step (20) of continuously verifying conditions such (Continued)

Figure 1:
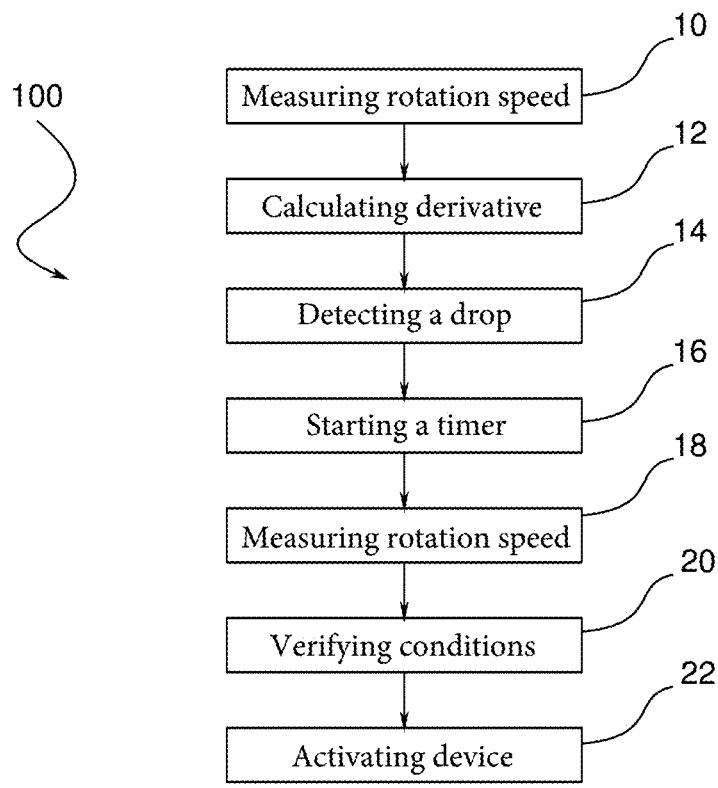

that the speed of rotation of the rotor is higher than a predetermined value, referred to as arming speed, and the drift of the rotation speed is lower than a predetermined value, referred to as arming drift, and a step (22) of activating the emergency device if the verified conditions are validated.

8 Claims, 2 Drawing Sheets

(51) Int. Cl.
  *B64C 27/06*  (2006.01)
  *B64C 27/57*  (2006.01)
  *B64D 31/06*  (2006.01)

(56) References Cited

U.S. PATENT DOCUMENTS

| | | | |
|---|---|---|---|
| 2014/0054411 A1* | 2/2014 | Connaulte | B64D 35/02 244/17.13 |
| 2014/0363288 A1* | 12/2014 | Schaeffer | B64C 27/57 416/1 |
| 2017/0088281 A1* | 3/2017 | Vallart | B64D 31/06 |

FOREIGN PATENT DOCUMENTS

| | | | |
|---|---|---|---|
| FR | 3019588 A1 | 10/2015 | |
| FR | 3026435 A1 | 4/2016 | |

* cited by examiner

METHOD AND SYSTEM FOR CONTROLLING AN EMERGENCY DEVICE

1. FIELD OF THE INVENTION

The invention relates to a method and a system for controlling an emergency device. In particular, the invention relates to a method and a system for controlling an emergency device of a helicopter, said emergency device allowing to supply additional emergency propulsive power to the helicopter.

2. TECHNOLOGICAL BACKGROUND

Helicopters are aircraft equipped with a rotor, made to rotate by at least one turbine engine via a principal transmission gearbox (BTP). The levitation of a helicopter is linked to the rotation of the rotor, generally at an almost constant pre-defined speed termed nominal speed (generally expressed in revolutions per minute).

When the pilot of the helicopter requires extra power from the turbine engine, the turbine engine may exceptionally authorise a transient regime called PMT20s regime (Maximum Transitory Power 20s) which is authorised for 20s on a single engine helicopter. This transient regime is situated several percent above the maximum take-off power (called PMD5 min).

But, in certain flight situations, the rotation speed of the rotor may vary abruptly (for example in case of degradation of areological conditions: gust of wind, temperature inversion, etc.), the pilot of a helicopter may need to execute particular actions (for example avoiding an obstacle) or the mass of a load to be transported is greater than estimated. In certain of these situations, the PMT20s may not be sufficient.

In addition, in case of a controlled or uncontrolled in-flight engine stop, additional emergency power may prove necessary in case of noticeable drop in the rotation speed of the helicopter rotor.

To do this, a solution has been found by introducing devices for additional emergency propulsive power in an instantaneous manner in case of noticeable drop in the rotation speed of the helicopter rotor. For example, the emergency device may include a gas generator producing a gas able to drive the turbines of a helicopter turbine engine and thus instantly increase the power available. One way of providing this emergency device is for example described in the application FR3019588 A1 of the applicant.

However, these emergency devices, as with most of the equipment equipping aircraft, are subject to strict safety constraints. In particular, these emergency devices must be active only when they are necessary (no inadvertent activation). The inventors have therefore sought a solution which allows reliable and simple control of these emergency devices.

3. OBJECTS OF THE INVENTION

The invention aims to remedy at least certain of the known disadvantages of emergency devices.

In particular, the invention aims to provide, in at least one embodiment of the invention, a method and system for controlling an emergency device.

The invention also aims to provide, in at least one embodiment, a method and control system tolerating operational situations that may lead to inadvertent activation of the emergency device.

The invention also aims to provide, in at least one embodiment, a method and control system that may be integrated into an existing helicopter.

The invention also aims to provide, in at least one embodiment, a simple control system comprising a minimum of components.

The invention also aims to provide, in at least one embodiment, a control system that is easy to maintain.

The invention also aims to provide, in at least one embodiment, a method and a control system compatible with turbine engine versions with or without an engine regulation system of the FADEC (Full Authority Digital Engine Control) type.

4. DISCLOSURE OF THE INVENTION

To do this, the invention relates to a method of controlling an emergency device of a helicopter, said helicopter comprising a rotor adapted to be rotated, said emergency device being adapted to supply additional emergency propulsive power to the helicopter, said method comprising the following steps:
a step of measuring the rotation speed of the helicopter rotor,
a step of calculating the derivative of the measured rotation speed,
a step of detecting a drop in the rotation speed of the rotor at an instant t0, below a nominal rotation speed $V_{NRnom}$ of the helicopter rotor,
a step of activating a timer measuring the $\Delta t$ duration from the instant t0, the timer being activated as long as the rotation speed of the rotor is dropping,
a step of measuring at an instant t0+$\Delta t$ the rotation speed $V_{NR}$ of the rotor,
a step of continuously verifying the following conditions:
the rotation speed of the rotor is greater than a predetermined value, said arming speed,
the derivative of the rotation speed is lower than a predetermined value, said arming derivative,
the derivative of the rotation speed at instant t0+dt is lower than or equal to $$\frac{V_{DEC} - V_{NR}}{\Delta t}$$

the derivative of the rotation speed at instant t0+$\Delta t$ is greater than or equal to $$\frac{V_{DEC} - V_{NRnom}}{\Delta t}$$

with $V_{DEC}$ being the stall speed of the helicopter rotor, below which the helicopter is in stall due to the loss of lift of the helicopter,
an activation step of the emergency device if the verified conditions are validated.

A control method according to the invention allows therefore controlling an emergency device by applying certain safety restrictions allowing to prevent inadvertent activation in situations where activation of the emergency device is not wanted. The fact that the rotor speed is measured instead of the engine speed allows controlling the emergency device to a value having an important connection to the helicopter lift. In particular, the rotation speed of the engine is not linked to the helicopter lift, in particular when this one has stopped, and the helicopter is in autorotation. The control method allows activating the emergency device without needing any action from the pilot. Indeed, in certain situations, the delay in pilot reaction, even if the pilot is quick to react, would be too long and would risk leading to a helicopter stall.

In particular, the emergency method verifies the pre-cited conditions to prevent activation of the emergency device on the ground: measurement of the speed and the comparison to an arming speed avoids activation of the emergency device when the helicopter is stopped, the rotor may turn at low speed on the ground for example, due to the wind. The fact that the emergency device is not activated at low rotor speed (below arming speed) has no impact during flight because when the rotor speed is too low, activation of the emergency device may not in any case restore the rotor speed necessary to recover lift.

The arming speed ranges from 50% to 70% of the nominal rotor speed $V_{NRnom}$. In all cases, the arming speed is lower than the helicopter stall speed, below which the helicopter is in stall due to the loss of lift of the helicopter and depends on the type of helicopter and the rotor (in particular the blades).

The measurement of the derivative of the rotation speed of the rotor and its comparison to the derivative of the arming speed avoids activation of the emergency device when the helicopter is on the ground and the engine is stopped, leading to a slow reduction in the speed of the rotor (in particular when freewheeling, disconnected from the engine). Preferably, the arming speed derivative is equal to −10% of the nominal speed of the rotor $V_{NRnom}$ per second. In all cases, this value is negative, as the derivative taken into account in this control method and which may require activation of the emergency device are relative to a drop in the rotation speed of the rotor.

The emergency device is, for example, an emergency device as described in the application FR3019588 of the applicant, comprising a gas generator comprising a block of propellant, which allows, upon activation, the generation of a gas supplying an emergency turbine, the emergency turbine rotating a shaft whose mechanical energy can be recovered to add additional power to the rotor driven by a turbine engine.

The situations which may lead to the activation of the emergency device are notably the start of a controlled or uncontrolled engine stop during flight, a flare type manoeuvre at the end of a descent in autorotation, a sudden demand for extra power in exceptional situations (avoiding unexpected obstacles, temperature inversion at altitude, gusts of wind, etc.).

The control method allows, in addition, the verification, relative to the stall speed of the helicopter, in order to ensure that the helicopter is never in a stall state and to anticipate a drop in the rotation speed of the rotor which would lead to a stall.

The first verified condition at instant t0+Δt relative to the stall allows activating the emergency device if a drop in the rotation speed of the rotor is sufficient to suggest that the rotor is going to rapidly attain stall speed, beyond which it is difficult, even impossible to increase the speed of the rotor in order to achieve lift. This condition varies depending on time, such that the longer the rotation speed remains low, the greater the chance of activating the emergency device to avoid reaching stall speed.

The second verified condition at the instant t0+Δt relative to the stall allows avoiding the emergency device to be activated if the stall speed has already been attained, rendering useless the activation of the emergency device.

The stall speed is for example 80% of the nominal rotation speed of the rotor, preferably between 60% and 80% of the nominal rotation speed of the rotor. This stall speed depends on the characteristics of the helicopter and of its rotor.

Other conditions may be verified at the verification step.

Advantageously and according to the invention, the verification step verifies the following additional condition:
the derivative of the rotation speed is greater than a predetermined value, called disarming derivative.

According to this aspect of the invention, this additional condition allows avoiding the activation of the emergency device when the measured derivative value is manifestly erratic. Furthermore, this also avoids activation of the emergency device in case of failure of the derivative measurement system or in case of a dynamic anomaly of the measurement signal.

Preferably, the disarming derivative is less than −500% of the nominal speed of the rotor $V_{NRnom}$ per second. In all cases, the disarming derivative is less than −100% of the nominal speed of the rotor $V_{NRnom}$ per second.

The invention also relates to a control system for an emergency device of a helicopter, said helicopter comprising a rotor adapted to be rotated, said emergency device being adapted to supply additional emergency propulsive power to the helicopter, characterised in that it comprises:
an input, adapted to receive a measurement of the rotation speed of the helicopter rotor,
calculation means adapted to carry out the control method according to the invention,
an ignition output configured to transmit an activation order to the control device if the verified conditions are validated by said control method.

A control system according to the invention therefore allows carrying out the method according to the invention thanks to calculation means equipping the helicopter. This system may advantageously be added to the helicopter as independent equipment, thus reducing or limiting the certifications necessary for this independent system without compromising the helicopter certification. In particular, the control system (and the associated emergency device) may be integrated into a helicopter which has already flown, to improve its safety. In particular, by not connecting the control system to a control system already present in the helicopter allows avoiding compromising the behaviour of the regulation equipment through electromagnetic interference and lightning.

The system comprises the simple calculation means such as a calculator, computer, integrated or non-integrated combinatorial electronic circuit, etc. Thus, the system comprises few components, is simple, and may function in an open loop. Its maintenance is simple.

According to other versions of the invention, the control system may be integrated totally or partially into a helicopter control equipment, for example in the FADEC. This integration allows limiting the quantity of necessary equipment, but requires a more complex certification.

Thus, the invention is compatible with helicopters comprising turbine engines, with or without FADEC.

Advantageously, the control system according to the invention comprises a status output, adapted to transmit information relative to the operating status of the control system.

According to this aspect of the invention, this output allows controlling the operational status of the control system and therefore to know if the emergency device may be activated or not. For example, the status output may indicate the following statuses:
ON: control system on,
OFF: control system off,
ALIM: control system powered,
FAULT: control system fault.

Advantageously, the control system according to the invention comprises a power supply input adapted to transmit electrical energy allowing the calculation means to function and the transmission of the activation order to the control device.

According to this aspect of the invention, the supply used is for example the supply onboard the helicopter and allows supplying the calculation means and performing the activation order. Thus, the ignition output has sufficient electrical energy to itself activate the emergency device, for example by creating a spark, heating a component, etc. which allows for example a propellant-type fuel to be ignited.

The supply to which the supply input is connected is for example an onboard network of the 28V DC type and the ignition output delivers a signal of the type 1A and 1W.

According to other versions of the invention, the activation order is a digital signal and the emergency device comprises the means for its own activation, supplied separately.

Advantageously, the control system according to the invention comprises a plurality of inputs adapted to receive information from helicopter sensors and/or information from the emergency device sensors.

The information coming from the helicopter sensors is for example:
ambient temperature,
ambient pressure.

The information coming from the emergency device sensors is for example:
temperature of a block of propellant of the emergency device,
rotation speed of the emergency device backup turbine.

The control system may further comprise control outputs from the emergency device equipment. For example, the application FR3026435 A1 of the applicant describes a test device for the emergency device which allows injecting air into the backup turbine to test its operation. The injected air comes from air circulating within the turbine engine and is injected via a solenoid valve deriving a part of this air: the control system may control this solenoid valve to perform the mechanical integrity test of this backup turbine.

These inputs and outputs allow the testability and availability of the control system to be improved.

The invention also relates to a helicopter comprising a rotor adapted to be rotated, characterised in that it comprises an emergency device and a control system according to the invention.

The invention also relates to a control process, a control system and a helicopter, characterised in combination by all or part of the characteristics mentioned above or below.

5. LIST OF FIGURES

Figure 2:
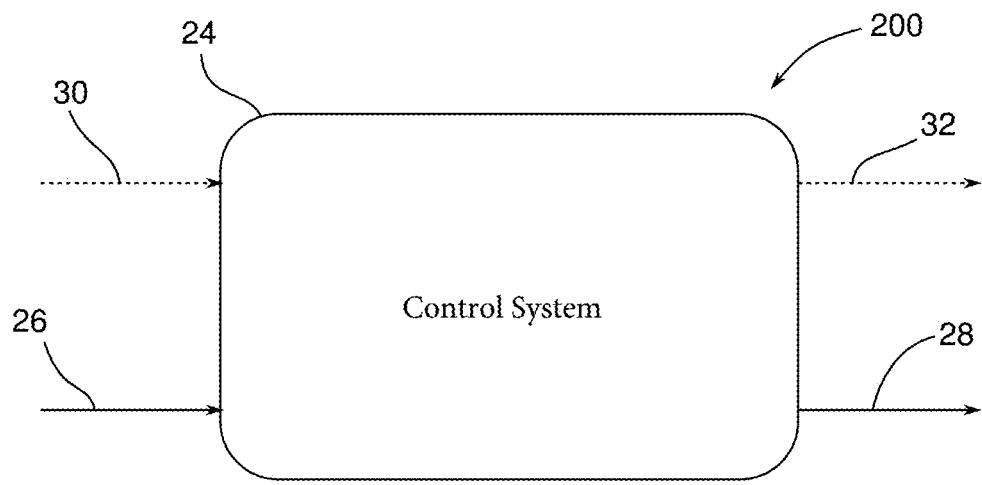
Figure 3:
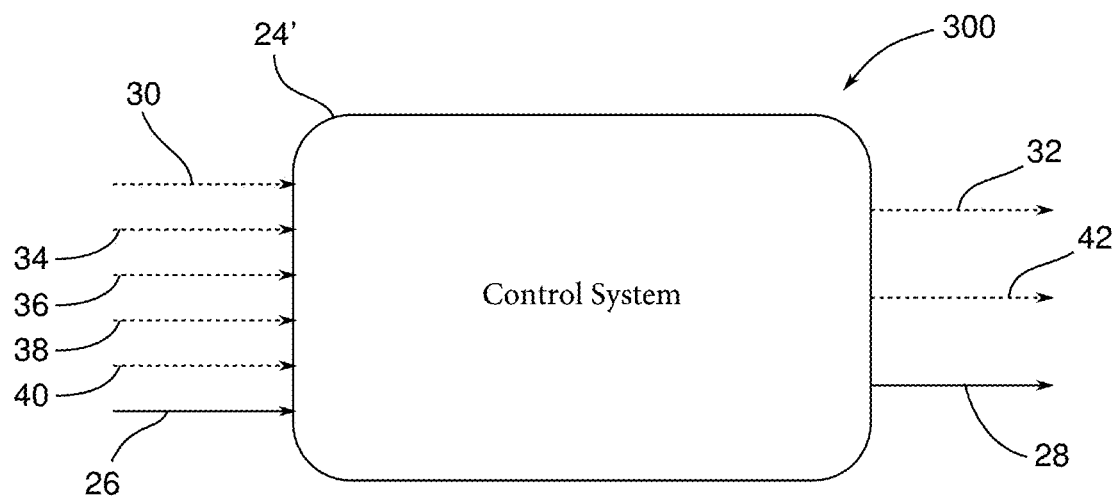
Figure 4:
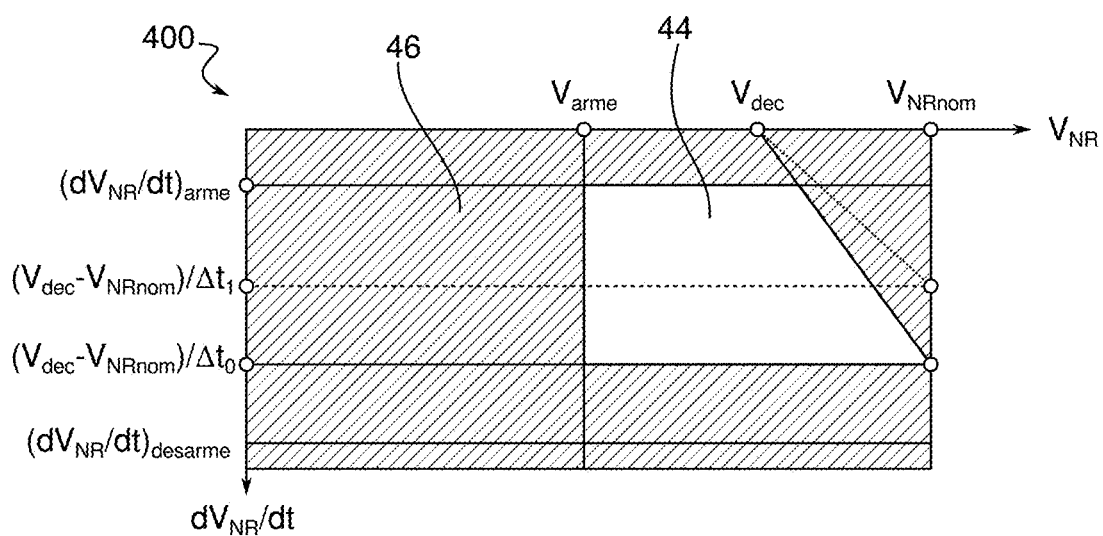

Other objects, characteristics and advantages of the invention will become apparent upon reading the following description given solely by way of a non-limiting example and with reference to the appended figures, wherein:

FIG. 1 is a schematic view of a control method according to an embodiment of the invention FIG. 2 is a schematic view of a control system according to a first embodiment of the invention, FIG. 3 is a schematic view of a control system according to a second embodiment of the invention, FIG. 4 is a schematic view of a graph representing the activation zone of the emergency device controlled by a control method according to an embodiment of the invention, depending on the rotation speed of the rotor and the derivative of the rotation speed of the rotor.

6. DETAILED DESCRIPTION OF AN EMBODIMENT OF THE INVENTION

The following embodiments are examples. Even though the description refers to one or several embodiments, this does not necessarily mean that each reference relates to the same embodiment, or that the characteristics apply to a single embodiment. Simple characteristics of different embodiments may also be combined to form other embodiments. In the figures, scale and proportions are not strictly respected for purposes of illustration and of clarity.

FIG. 1 represents schematically a control method according to an embodiment of the invention, controlling an emergency device of a helicopter, said helicopter comprising a rotor adapted to be rotated, said emergency device being adapted to supply additional emergency propulsive power to the helicopter.

The control method 100 comprises a first step 10 of measuring the rotation speed of the helicopter rotor. The control process 100 then comprises a second step 12 for calculating the derivative of the measured rotation speed, in order to detect in particular a possible drop in the rotation speed. In this embodiment, the control method 100 further comprises additional steps, in particular a step 14 of detecting a drop in the rotation speed of the rotor at an instant t0 below a nominal rotation speed $V_{NRnom}$ of the helicopter rotor, a step 16 of starting a timer measuring the duration $\Delta t$ from the instant t0, the timer being activated as long as the rotation speed of the rotor is dropping, and a step 18 of measuring at an instant t0+$\Delta t$ the rotation speed $V_{NR}$ of the rotor.

The control method 100 then comprises a step 20 of continuously verifying several conditions, described in greater detail further on with reference to FIG. 4. Finally, if all the verified conditions are validated, the control method 100 comprises a step 22 of activating the emergency device.

FIG. 2 schematically shows a control system 200 according to a first embodiment of the invention, adapted to carry out a control method according to the embodiment presented in FIG. 1.

The control system 200 comprises calculation means 24, adapted to carry out the control method, which may consist of, for example, of a calculator, an integrated or non-integrated electronic circuit, etc. The calculation means 24 is connected to an input 26 adapted to receive the measurement of the rotation speed of the helicopter rotor and an output 28 for ignition, configured to transmit an activation order to the control device if the verified conditions are validated by the said control method.

In addition, in this first embodiment, the control system comprises a supply input 30 adapted to transmit electrical energy allowing the operation of the calculation means and the transmission of the activation order to the control device and a status output 32, adapted to transmit information relating to the operating status of the control system.

In a second embodiment, the control system 300 comprises additional inputs connected to the calculation means 24', in particular inputs coming from the helicopter sensors, for example:

an input 34 supplying the ambient temperature,
an input 36 supplying the ambient pressure,
or inputs supplying information coming from the emergency device sensors, for example:
an input 38 supplying the temperature of a block of propellant of the emergency device
an input 40 supplying the rotation speed of the emergency device backup turbine.

The system 24' according to this second embodiment may further comprise an output 42 for controlling a solenoid valve for testing the emergency device as described in application FR3026435 A1 of the applicant.

FIG. 4 schematically shows a diagram 400 representing the activation zone 44 of the emergency control device by a control method according to an embodiment of the invention, depending on the rotation speed of the rotor and the derivative of the rotation speed of the rotor.

The activation zone 44 corresponds to a zone in which all the conditions verified at the verification step are validated. In particular, the conditions verified at the verification step defining an activation zone 44 represented by a white background surrounded by an inhibition zone 46 represented by a hatched background. The borders between the zones are defined by the following conditions verified by the control method:
the rotation speed $V_{NR}$ of the rotor is greater than a predetermined value, called arming speed $V_{arme}$,
the derivative $dV_{NR}/dt$ of the rotation speed is lower than a predetermined value, called arming derivative $(dV_{NR}/dt)_{arme}$,
the derivative of the rotation speed $dV_{NR}/dt$ is greater than a predetermined value, called disarming speed derivative $(dV_{NR}/dt)_{desarme}$,
as represented by the two oblique lines, the derivative of the rotation speed $dV_{NR}/dt$ at instant t0+Δt is lower than or equal to:

$$\frac{V_{DEC} - V_{NR}}{\Delta t}$$

the derivative of the rotation speed at instant t0+Δt is greater than or equal to:

$$\frac{V_{DEC} - V_{NRnom}}{\Delta t}$$

with $V_{DEC}$ being the stall speed of the helicopter rotor, below which the helicopter is in stall due to the loss of lift of the helicopter.

The two last conditions vary as a function of time measured by the timer, and are shown in FIG. 4 by:
two continuous lines for a first time $\Delta t_1$ measured by the timer (the activation zones represented correspond to this first measured time),
two dotted lines for a second time $\Delta t_e$ measured by the timer (in this representation, the zones of activation and inhibition are different from those represented and are delimited by dotted lines).

For Δt=0, the line is vertical as the point $(V_{DEC}-V_{NRnom})/\Delta t$ is at infinity.

The invention claimed is:

1. A control method for an emergency device of a helicopter, said helicopter comprising a rotor adapted to be rotated, said emergency device being adapted to supply additional emergency propulsive power to the helicopter, said method comprising the following steps:
a step of measuring the rotation speed of the helicopter rotor,
a step of calculating the derivative of the measured rotation speed,
a step of detecting a drop in the rotation speed of the rotor at an instant t0 below the nominal rotation speed $V_{NRnom}$ of the helicopter rotor,
a step of activating a timer to measure the duration Δt from the instant t0, the timer being activated as long as the rotation speed of the rotor is dropping,
a step of measuring at an instant t0+Δt the rotation speed of the rotor $V_{NR}$,
a step of continuously verifying the following conditions:
the rotation speed of the rotor is greater than a predetermined value, called arming speed,
the derivative of the rotation speed is greater than a predetermined value, called arming derivative,
the derivative of the rotation speed at instant t0+Δt is lower than or equal to:

$$\frac{V_{DEC} - V_{NR}}{\Delta t}$$

the derivative of the rotation speed at instant t0+Δt is greater than or equal to:

$$\frac{V_{DEC} - V_{NRnom}}{\Delta t}$$

with $V_{DEC}$ being the stall speed of the helicopter rotor, below which the helicopter is in stall due to the loss of lift of the helicopter,
an activation step of the emergency device if the verified conditions are validated.

2. The control method according to claim 1, wherein the verification step verifies the following additional condition:
the derivative of the rotation speed is greater than a predetermined value, called disarming derivative.

3. A control system for an emergency device of a helicopter, said helicopter comprising a rotor adapted to be rotated, said emergency device being adapted to supply additional emergency propulsive power to the helicopter, said control system comprising:
an input adapted to receive a measurement of the rotation speed of the helicopter rotor,
calculation means adapted to carry out the control method according to claim 1,
an ignition output configured to transmit an activation order to the control device if the verified conditions are validated by said control process.

4. The control system according to claim 3, further comprising a supply input adapted to transmit electrical energy which allows the calculation means to operate and to transmit the activation order to the control device.

5. The control system according to claim 3, further comprising a status output, adapted to transmit information relative to the operating status of the control system.

6. The control system according to claim 3, further comprising a plurality of inputs adapted to receive information from the helicopter sensors and/or information from the emergency device sensors.

7. A helicopter comprising said emergency device according to claim 3.

8. A control method for an emergency device of a helicopter, said helicopter comprising a rotor adapted to be rotated, said emergency device being adapted to supply additional emergency propulsive power to the helicopter, said method comprising the following steps:
a step of measuring the rotation speed of the helicopter rotor,
a step of calculating the derivative of the measured rotation speed,
a step of detecting a drop in the rotation speed of the rotor at an instant t0 below the nominal rotation speed VNRnom of the helicopter rotor,
a step of activating a timer to measure the duration $\Delta t$ from the instant t0, the timer being activated as long as the rotation speed of the rotor is dropping, a step of measuring at an instant t0+$\Delta t$ the rotation speed of the rotor VNR, a step of continuously verifying the following conditions:
the rotation speed of the rotor is greater than a predetermined value, called arming speed,
the derivative of the rotation speed is greater than a predetermined value, called arming derivative,
the derivative of the rotation speed at instant t0+$\Delta t$ is lower than or equal to:

$$\frac{V_{DEC} - V_{NR}}{dt}$$

the derivative of the rotation speed at instant t0+$\Delta t$ is greater than or equal to:

$$\frac{V_{DEC} - V_{NRnom}}{\Delta t}$$

with VDEC being the stall speed of the helicopter rotor, below which the helicopter is in stall due to the loss of lift of the helicopter,
an activation step of the emergency device if all the verified conditions are validated.

* * * * *